Figure 1:
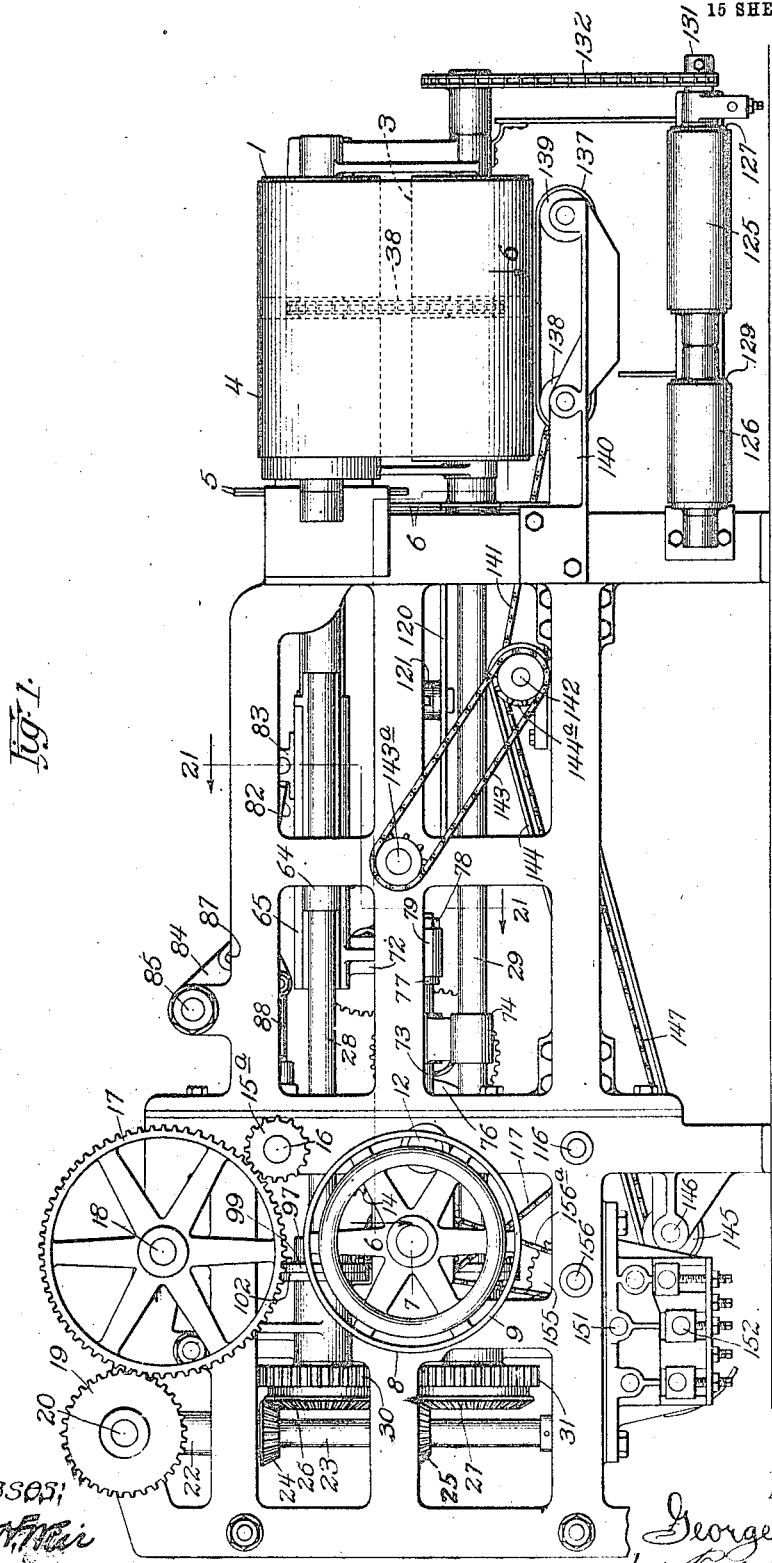
Figure 20:
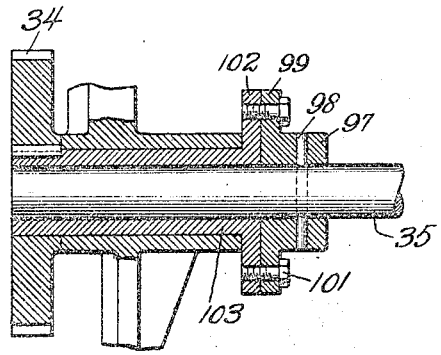
Figure 19:
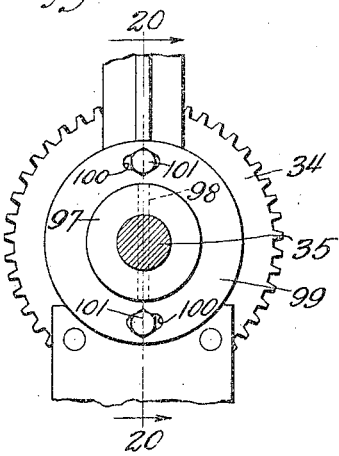
Figure 21:
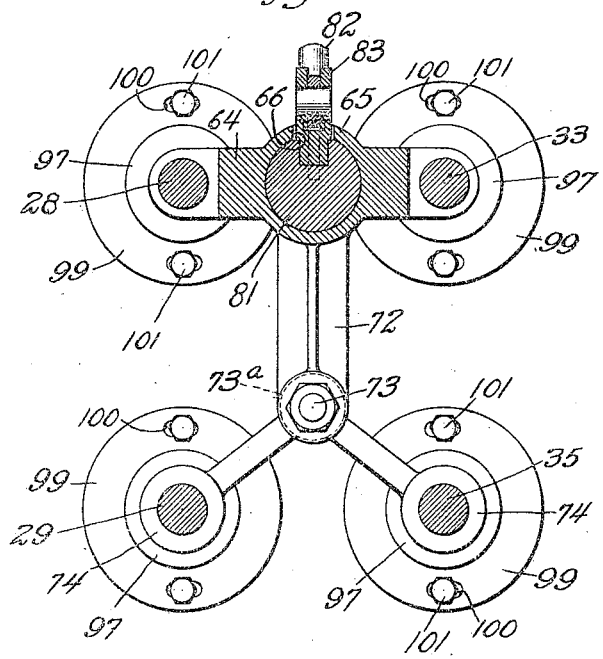
Figure 22:
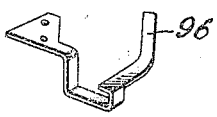

G. F. ECKART.
TOBACCO STEMMING MACHINE.
APPLICATION FILED DEC. 30, 1910.

1,032,192.

Patented July 9, 1912.
15 SHEETS—SHEET 1.

Witnesses:
Inventor
George F. Eckart
by

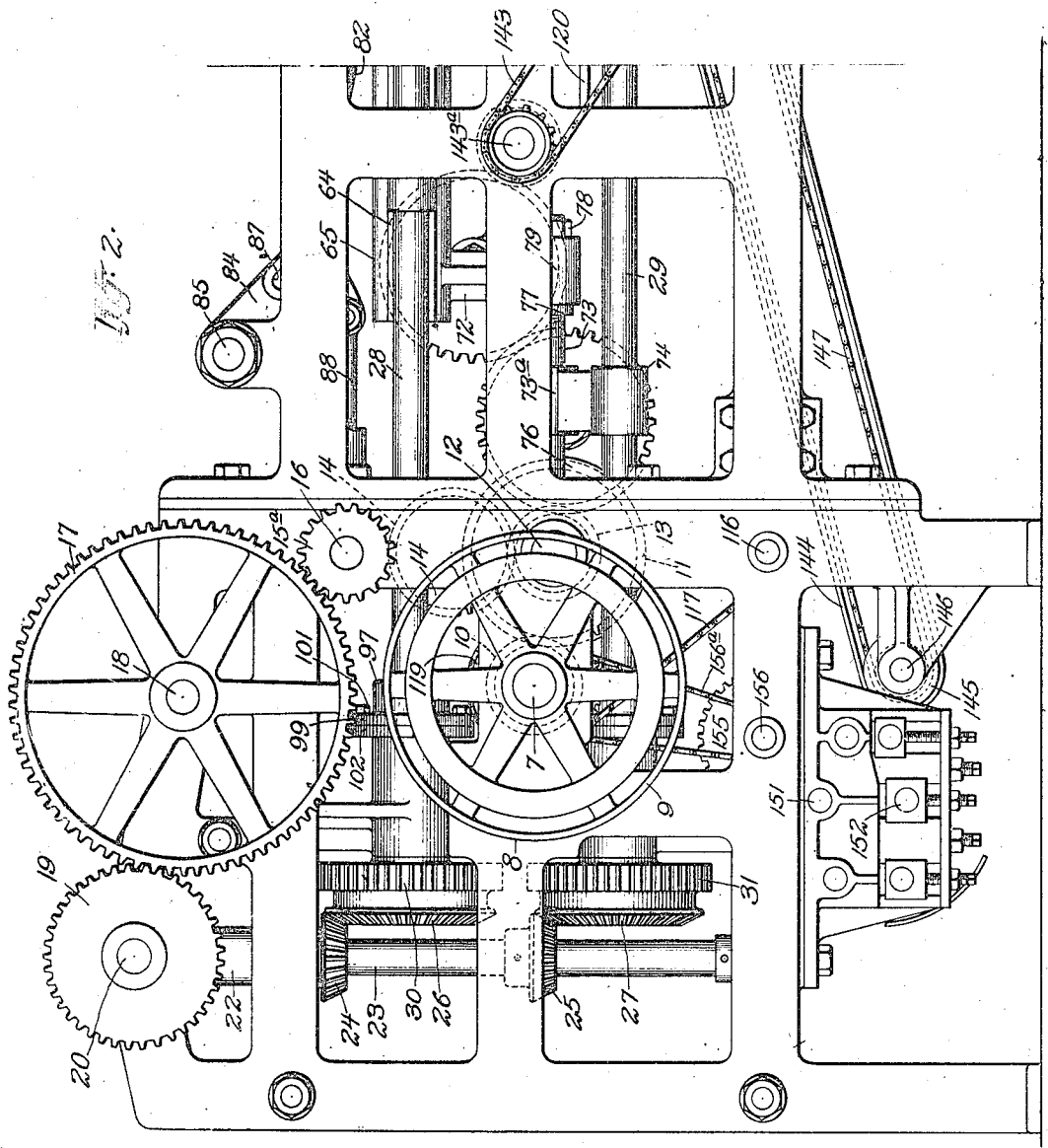

G. F. ECKART.
TOBACCO STEMMING MACHINE.
APPLICATION FILED DEC. 30, 1910.
1,032,192.
Patented July 9, 1912.
15 SHEETS—SHEET 3.
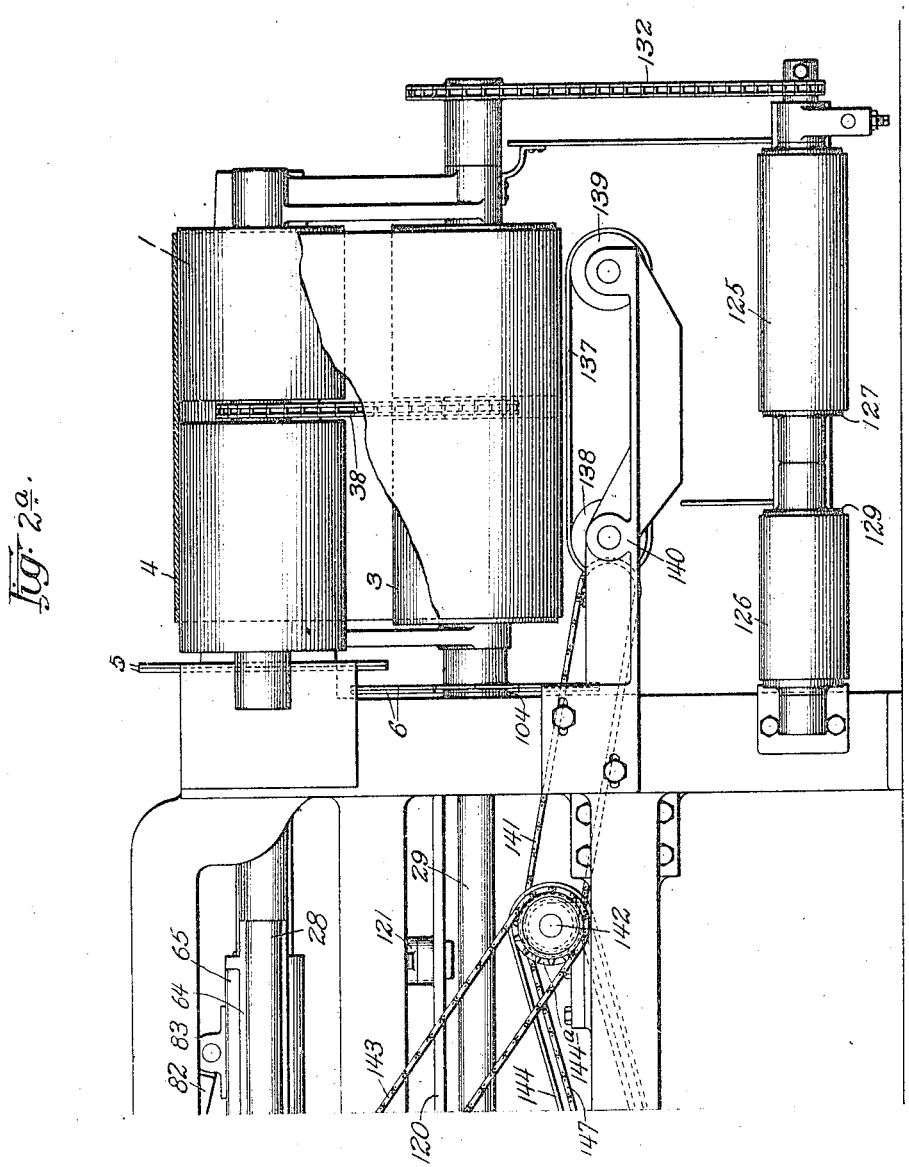

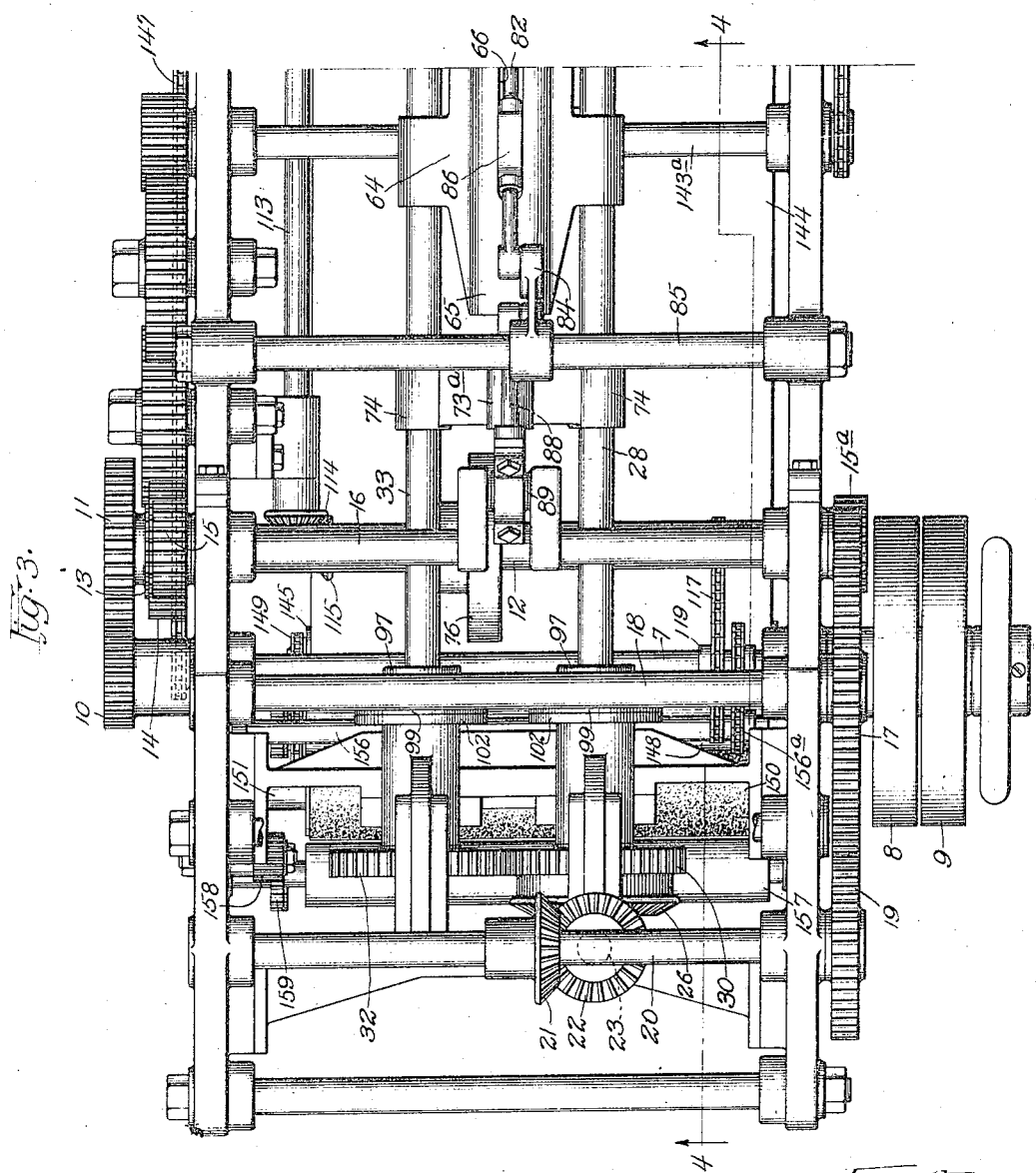

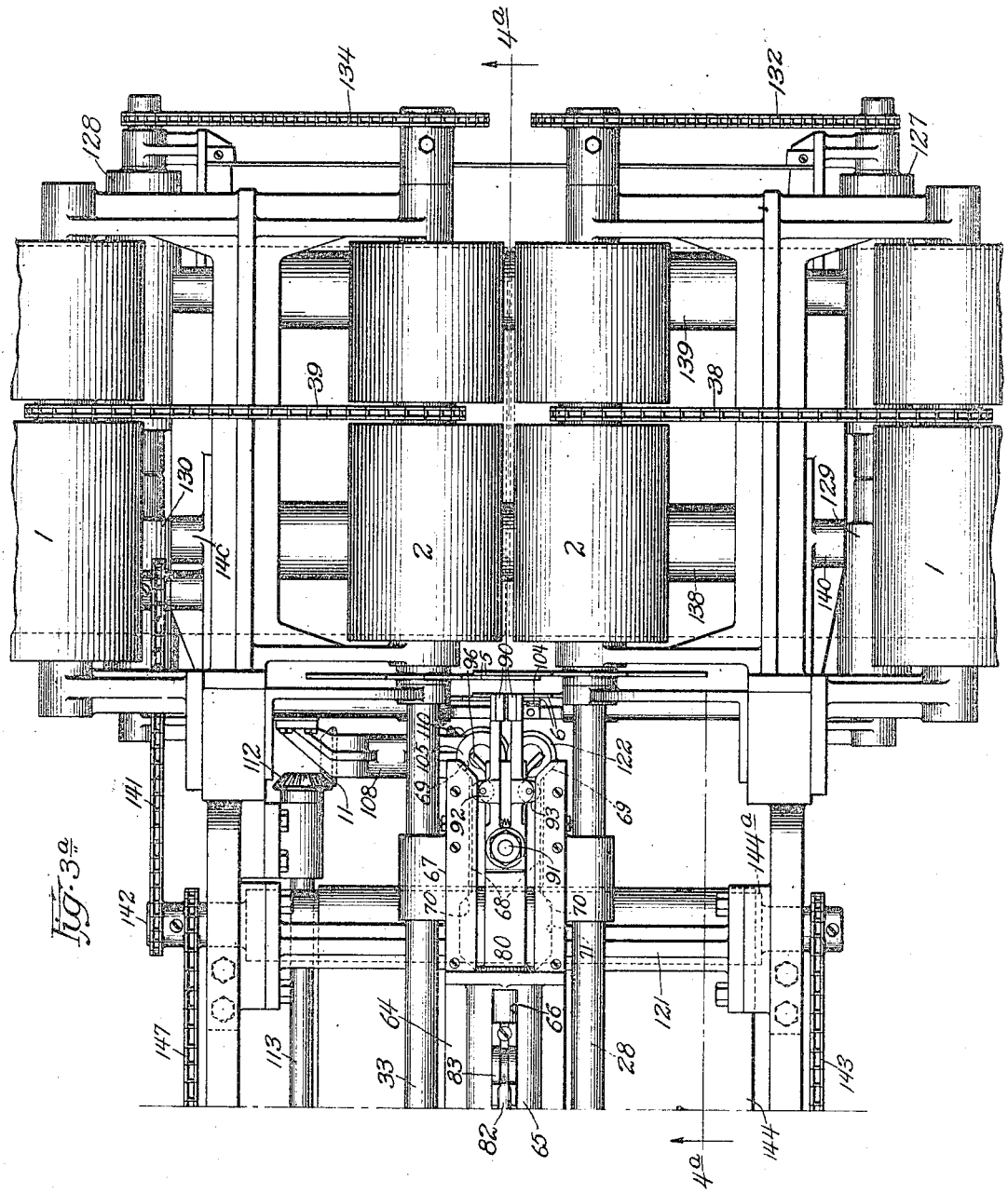

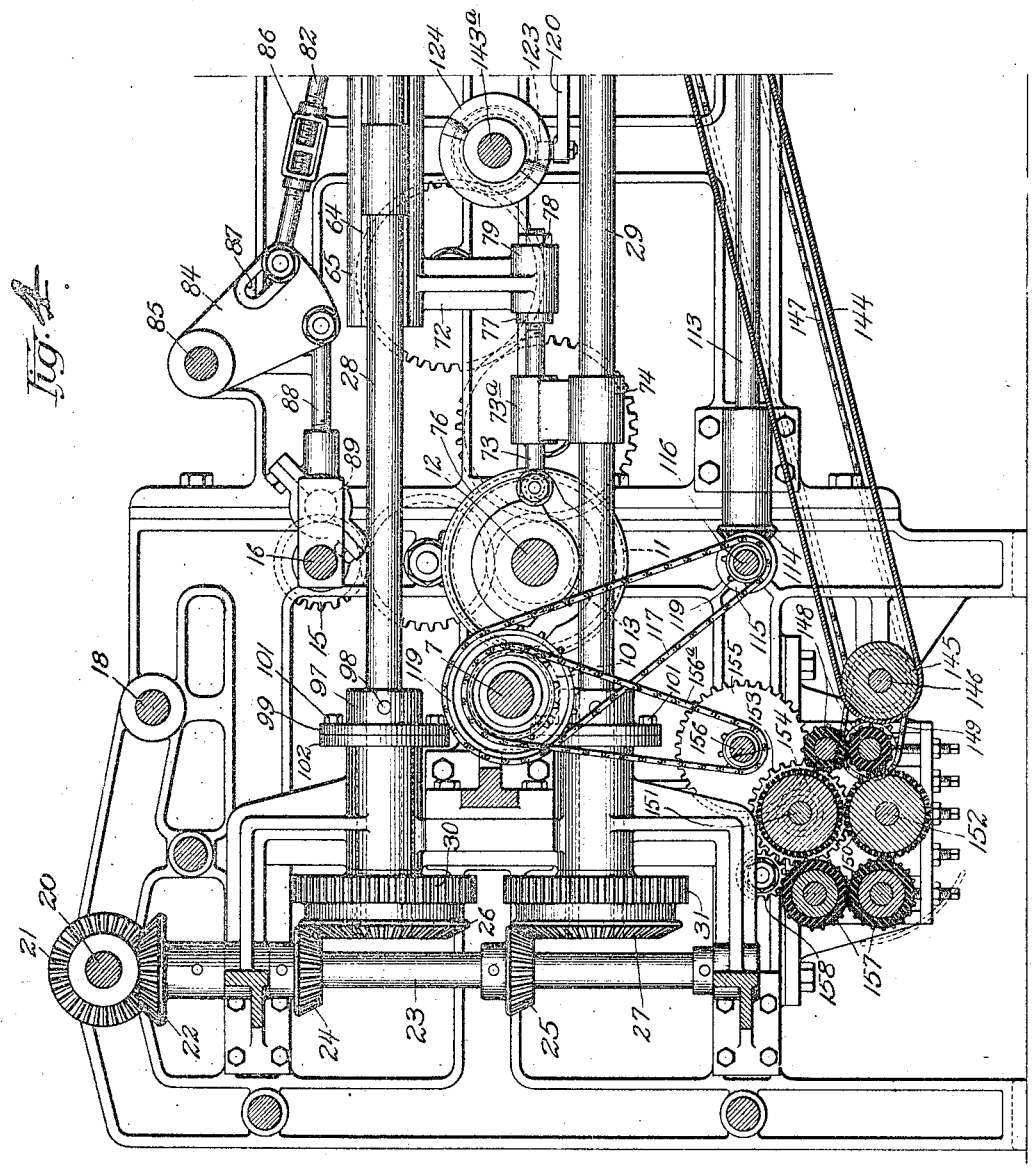

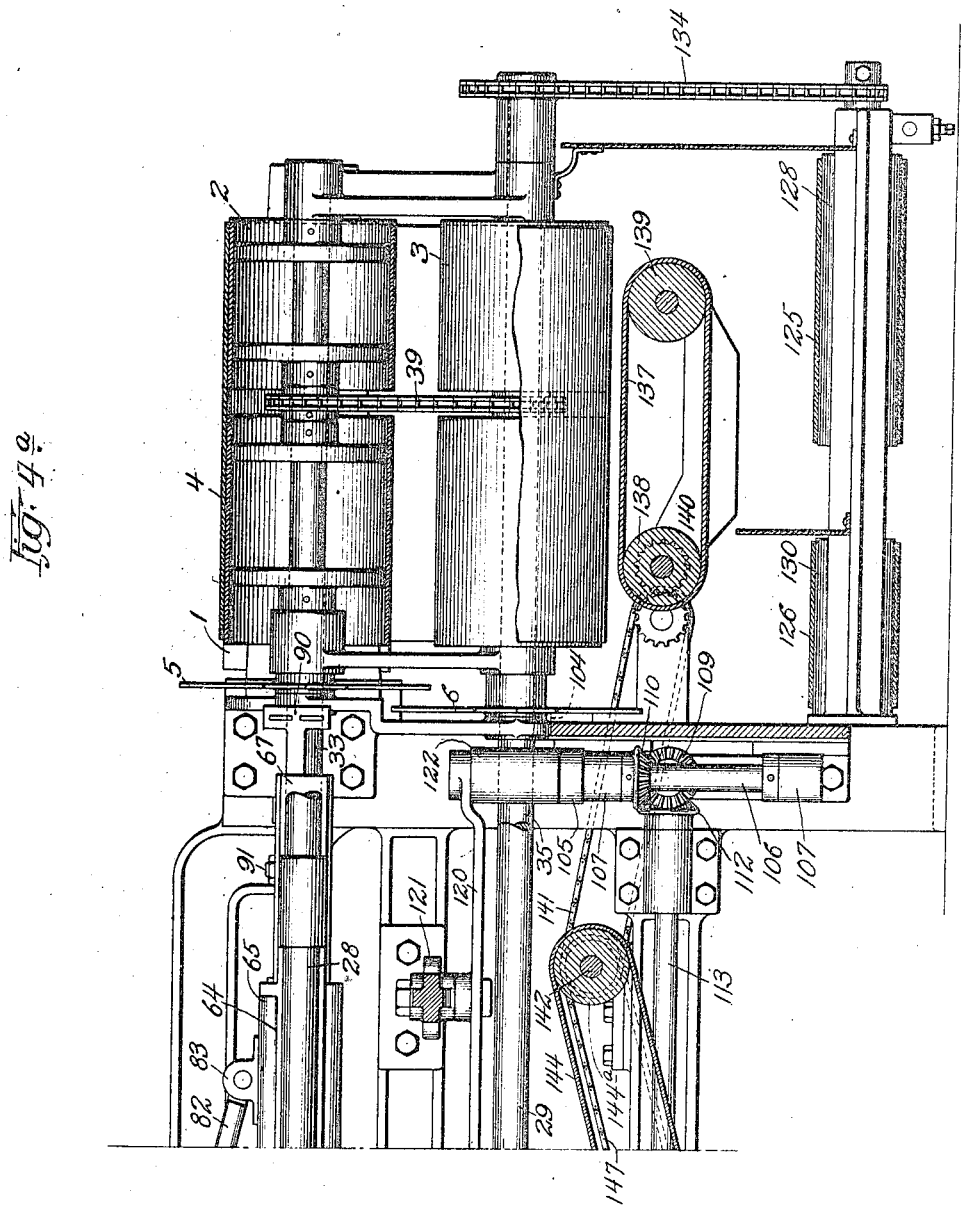

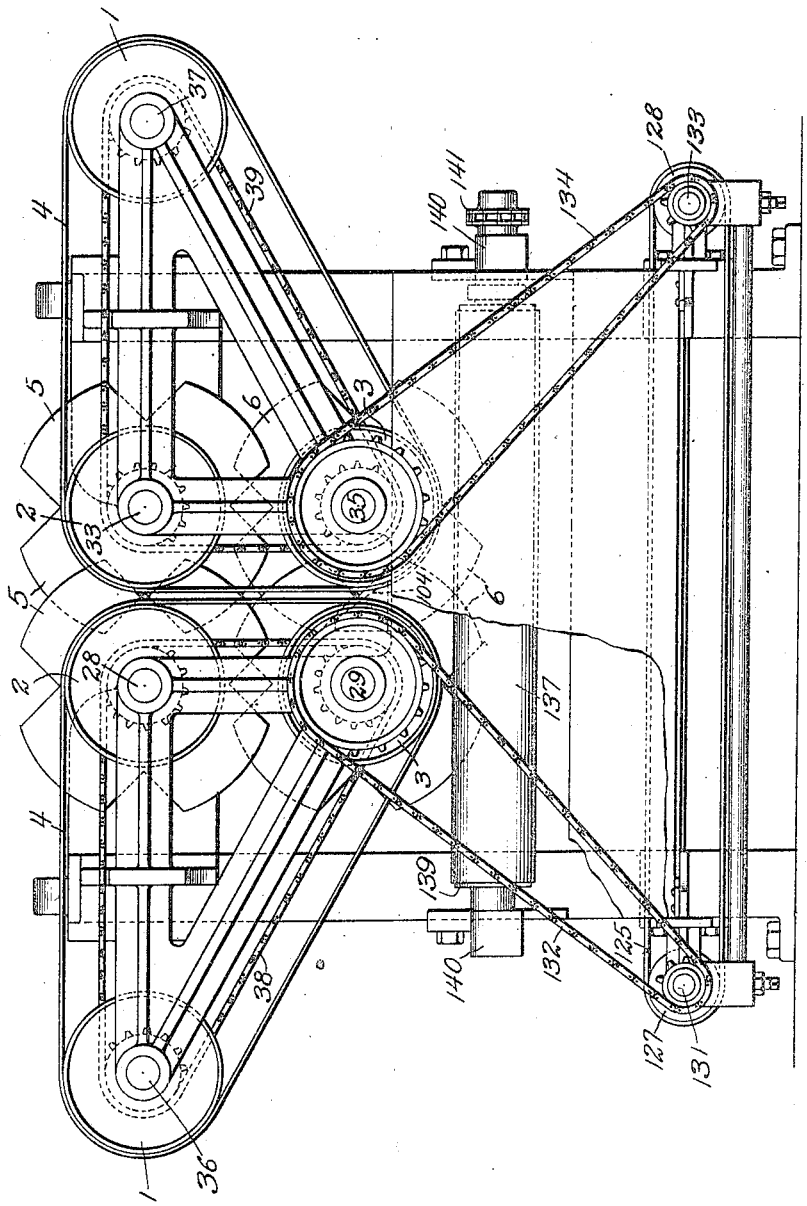

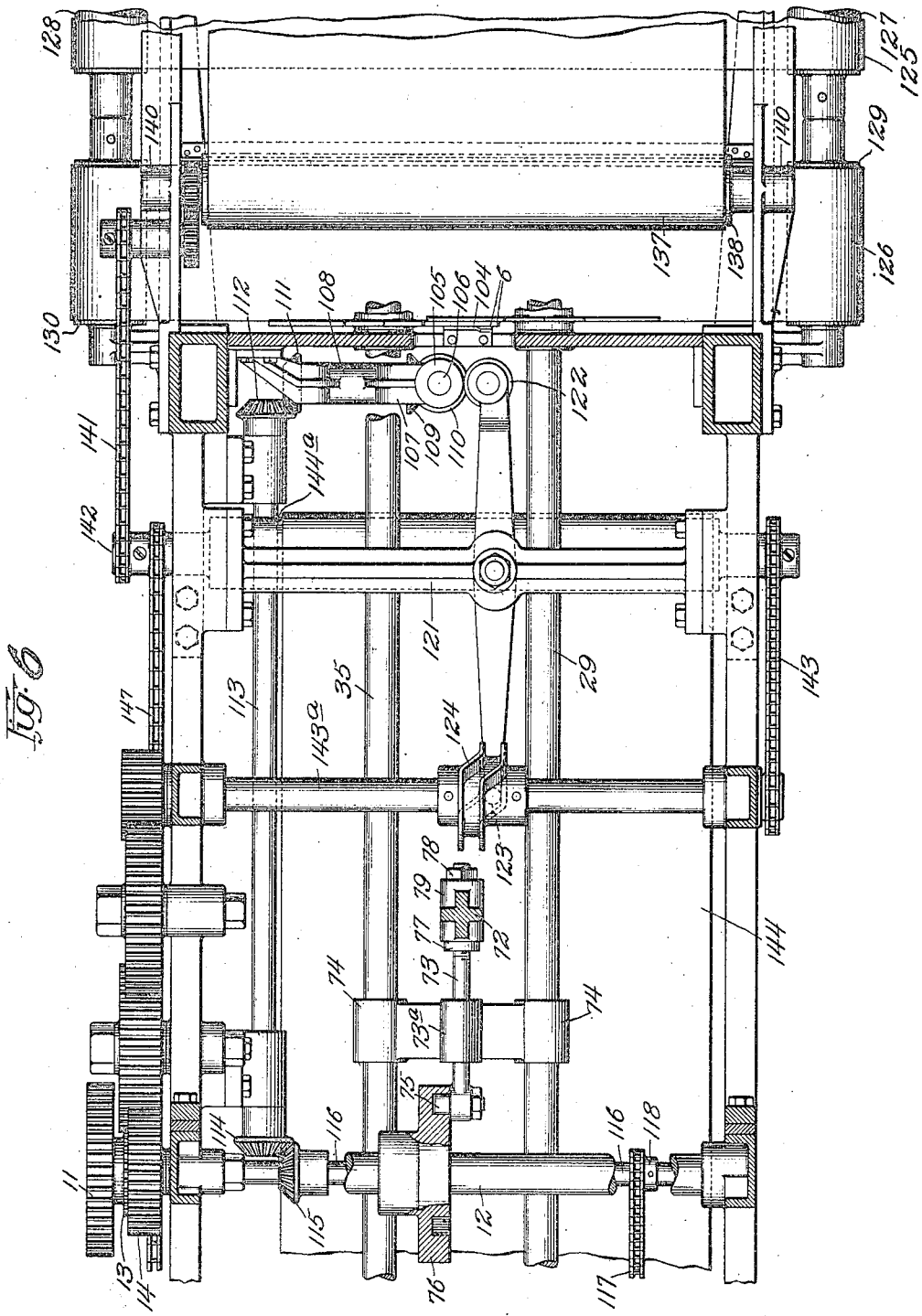

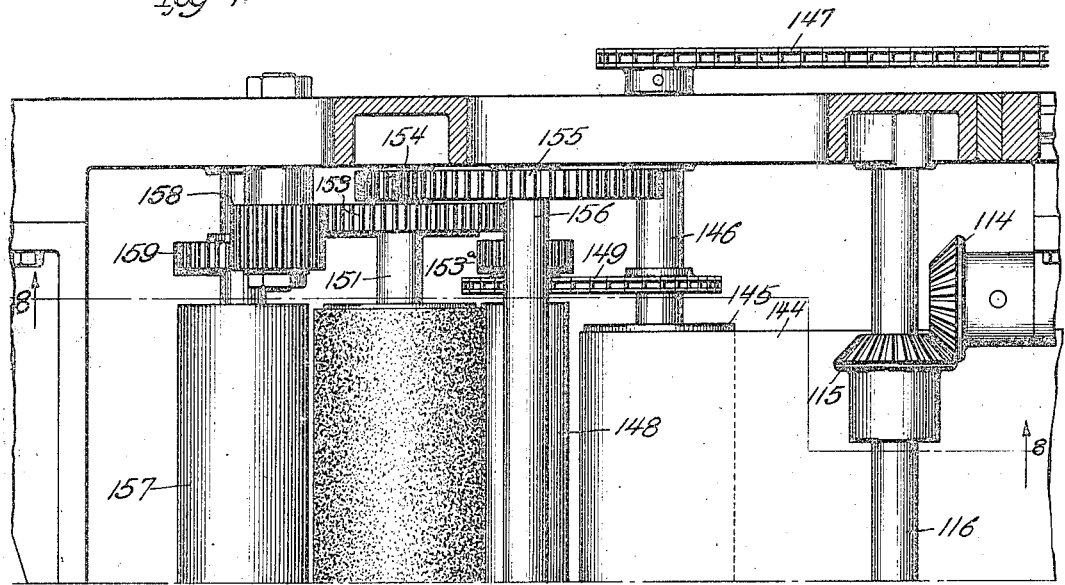
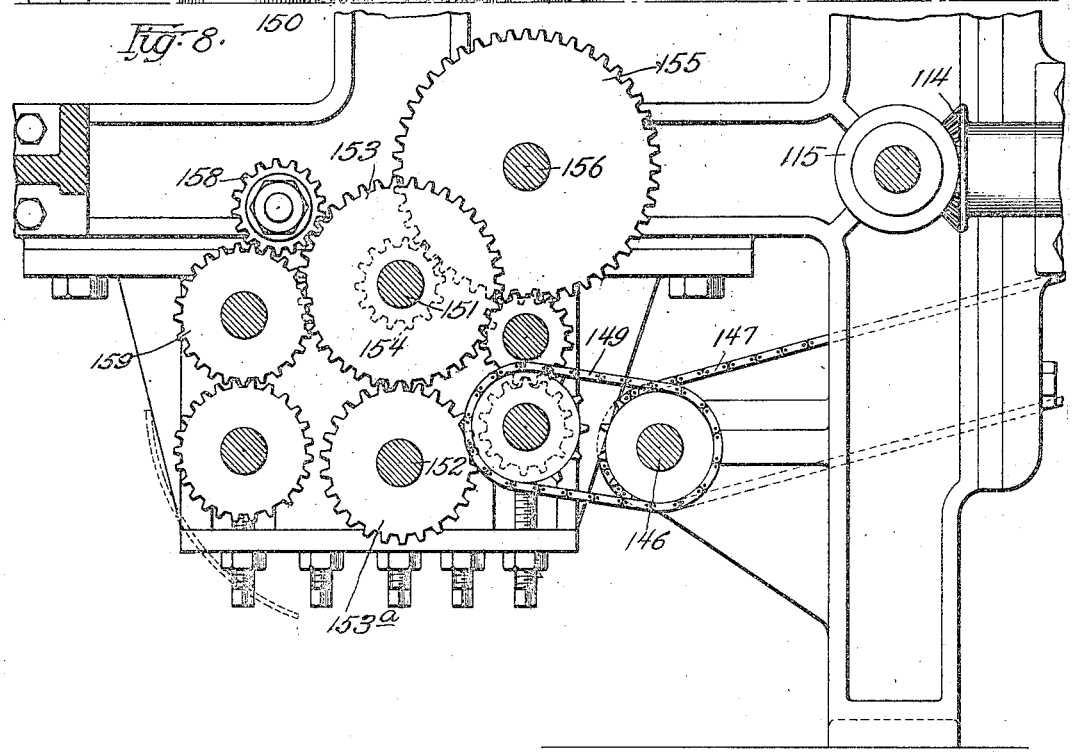

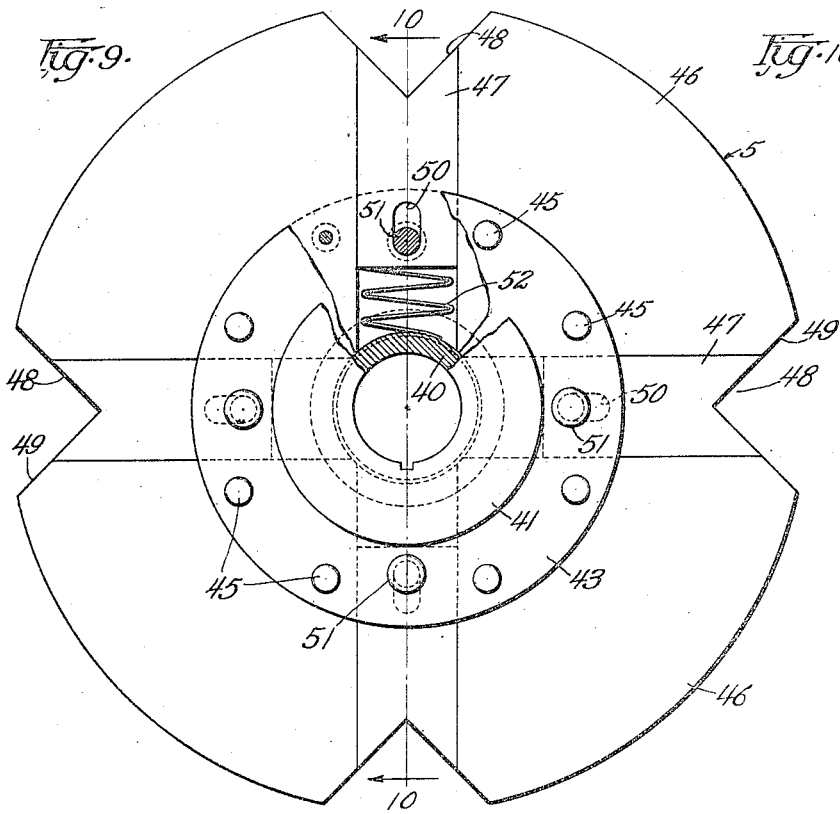
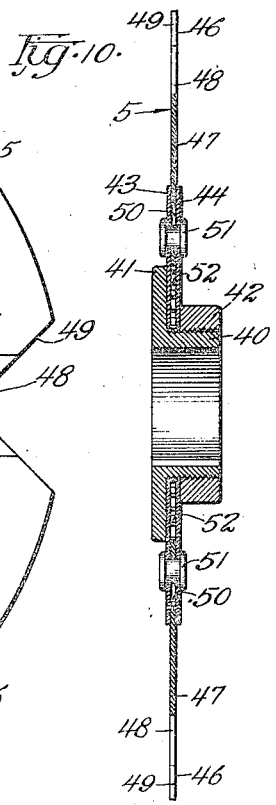
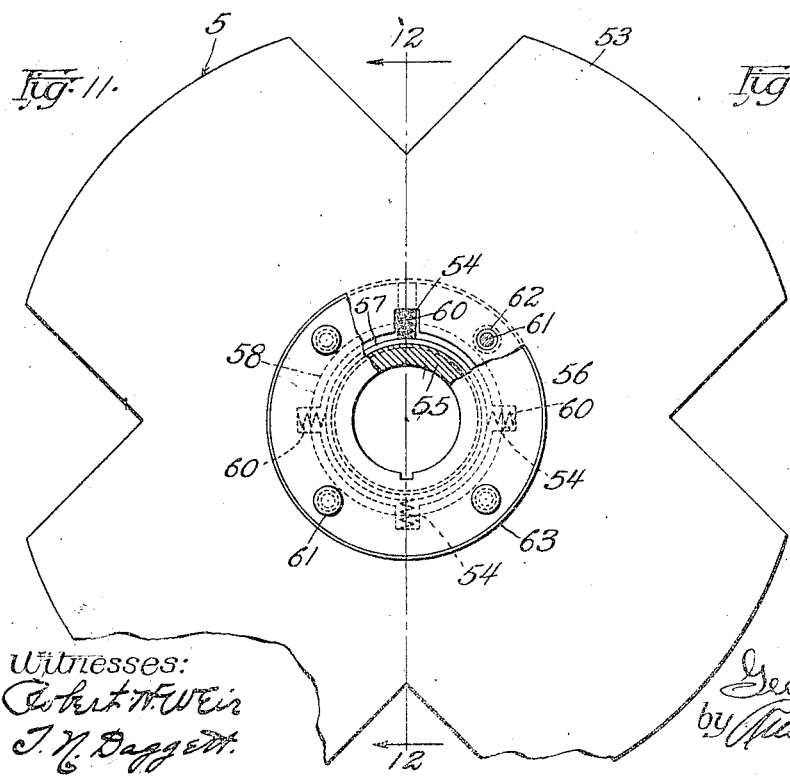
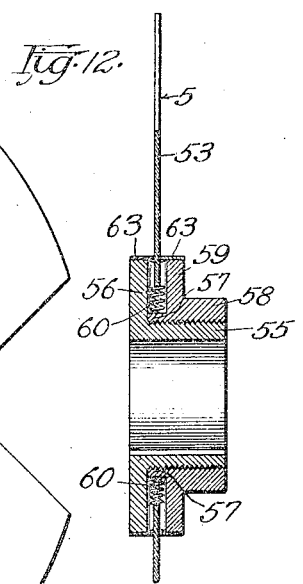

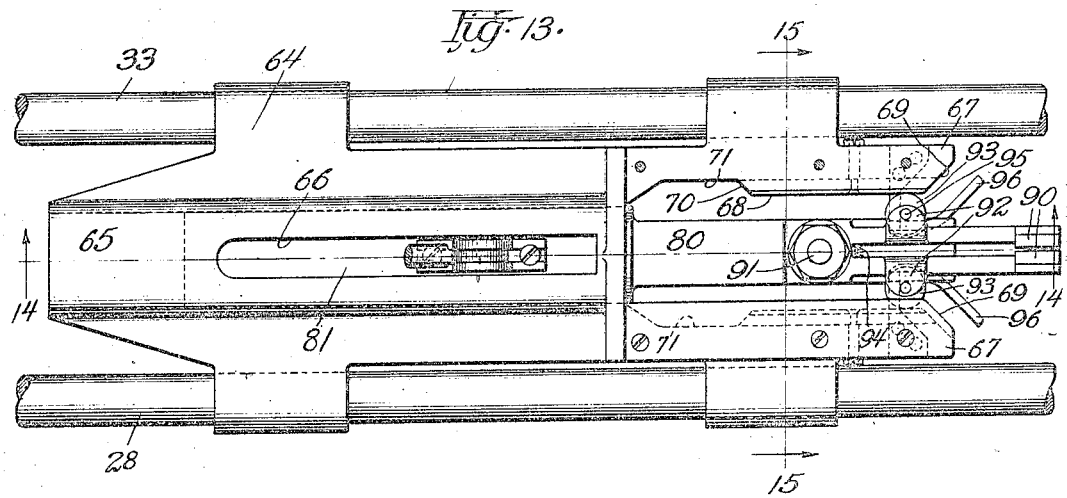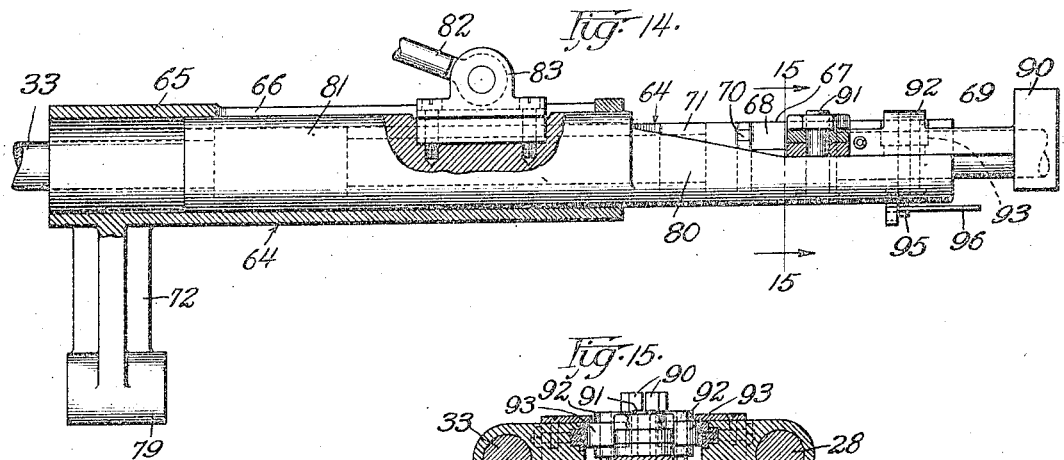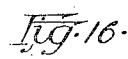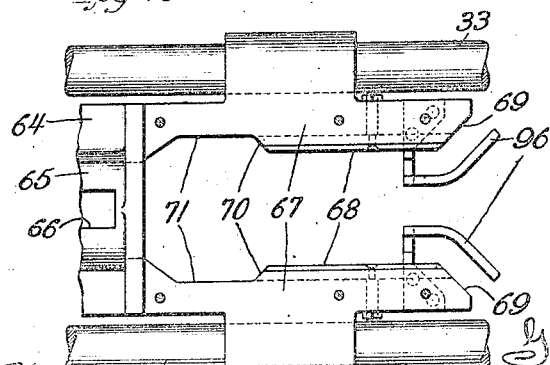

G. F. ECKART.
TOBACCO STEMMING MACHINE.
APPLICATION FILED DEC. 30, 1910.
1,032,192.
Patented July 9, 1912.
15 SHEETS—SHEET 13.
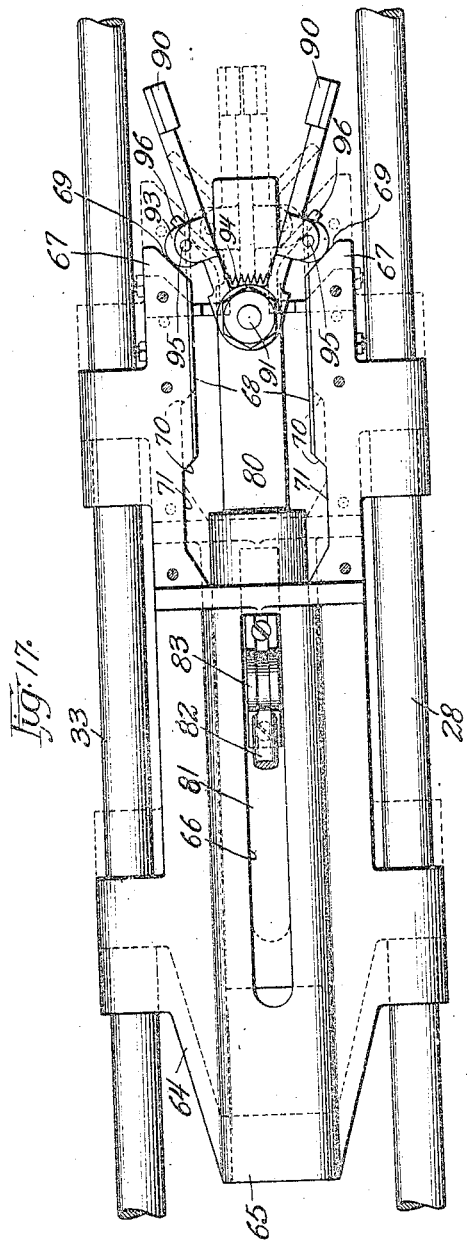
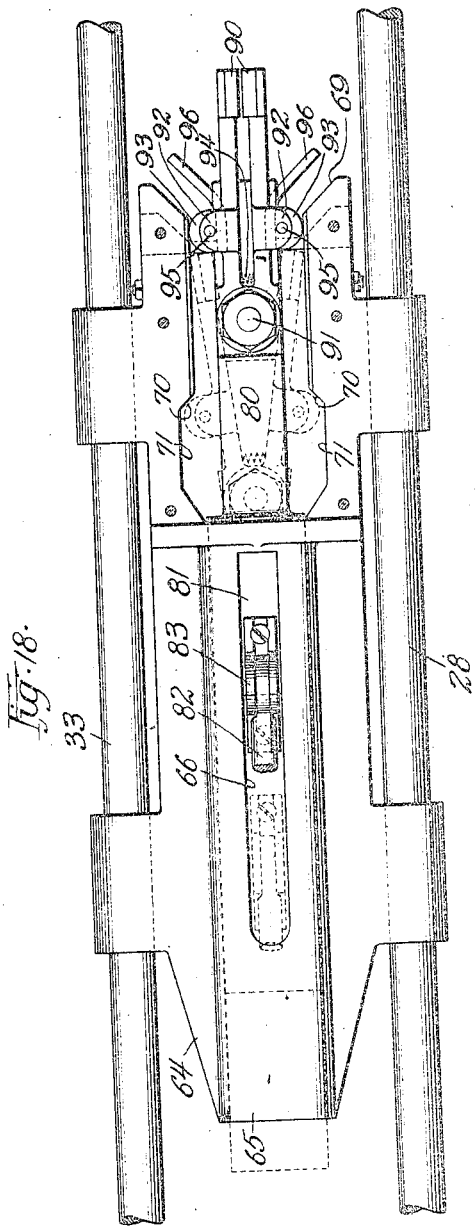
Witnesses:
Inventor
George F. Eckart

G. F. ECKART.
TOBACCO STEMMING MACHINE.
APPLICATION FILED DEC. 30, 1910.

1,032,192.

Patented July 9, 1912.
15 SHEETS—SHEET 14.

Witnesses:

Inventor
George F. Eckart
by Rudolph Inm. Fry
Atty.

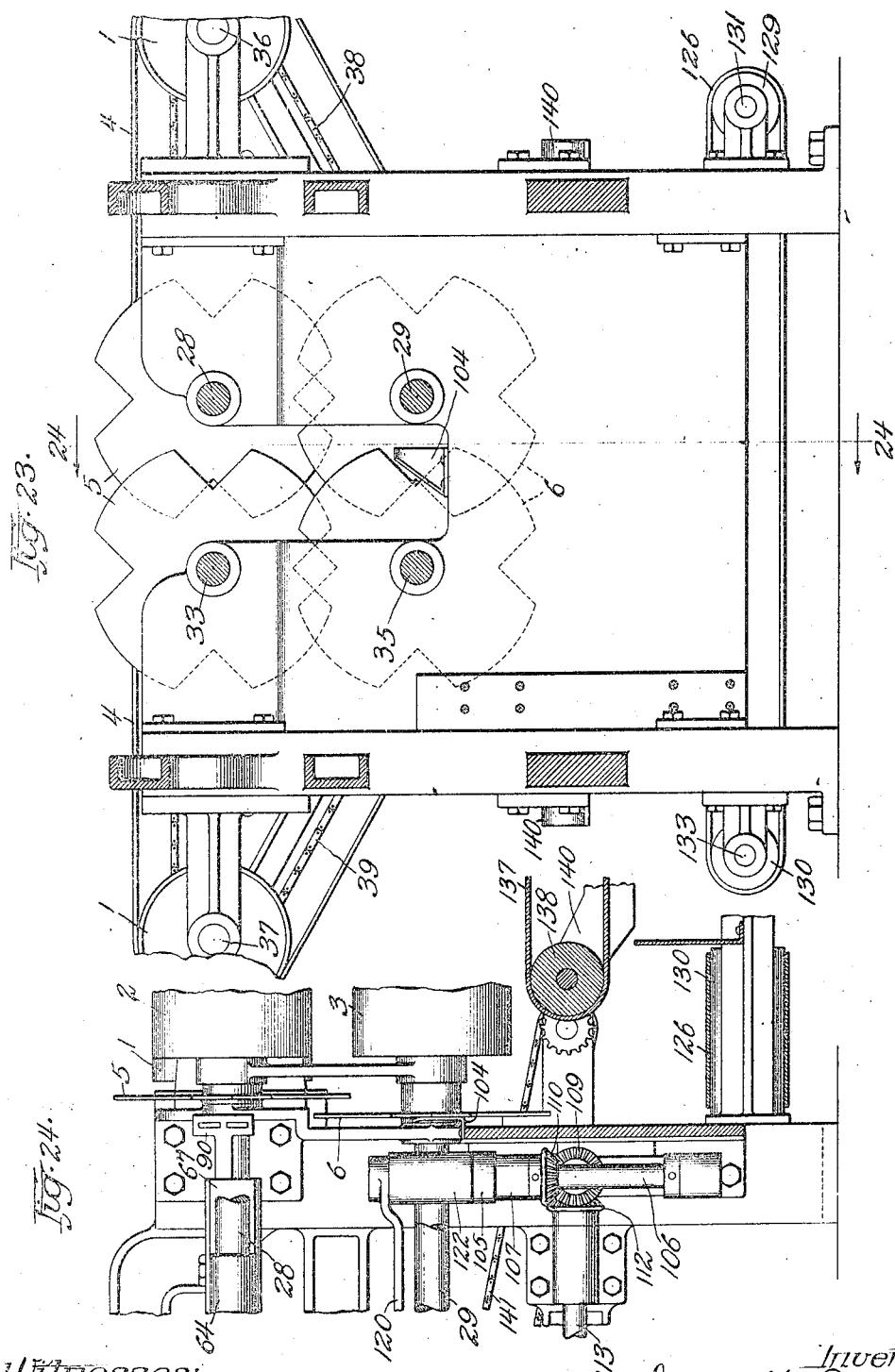

UNITED STATES PATENT OFFICE.

GEORGE F. ECKART, OF CHICAGO, ILLINOIS, ASSIGNOR, BY DIRECT AND MESNE ASSIGNMENTS, TO AUTOMATIC STEMMER COMPANY, A CORPORATION OF DELAWARE.

TOBACCO-STEMMING MACHINE.

1,032,192.  Specification of Letters Patent.  Patented July 9, 1912.

Application filed December 30, 1910.  Serial No. 600,197.

*To all whom it may concern:*

Be it known that I, GEORGE F. ECKART, citizen of the United States, residing at Chicago, in the county of Cook and State of Illinois, have invented certain new and useful Improvements in Tobacco-Stemming Machines; and I do hereby declare the following to be a full, clear, and exact description of the invention, such as will enable others skilled in the art to which it appertains to make and use the same.

This invention relates to improvements in tobacco stemming machines.

It has for its principal object to provide means whereby the stem of a tobacco leaf will be completely withdrawn and severed from the leaf proper throughout the length of the latter.

The invention consists in the features of construction and combinations of parts hereinafter fully described and claimed.

In the accompanying drawings illustrating a machine suitably embodying the invention: Figure —1— is a view in side elevation of a machine constructed in accordance with my invention. Figs. —2— and —2ª— together constitute a view similar to Fig. —1— on an enlarged scale, the same being further amplified by showing in dotted lines a number of parts omitted from illustration in Fig. —1—. Figs. —3— and —3ª— together constitute a plan view of the machine. Figs. —4— and —4ª— together constitute a vertical longitudinal section of the machine taken on the line 4—4 of Fig. —3—, and —4—2— of Fig. —3ª—. Fig. —5— is a front elevation of the machine. Fig. —6— is a plan section of the machine taken on the line 6—6 of Fig. —1—. Fig. —7— is a fragmentary detail plan view partly in section showing the stem cleaning mechanism employed. Fig. —8— is a vertical longitudinal section on the line 8—8 of Fig. —7—. Fig. —9— is a view in elevation partly in section of one of the stem engaging disks employed. Fig. —10— is a central section of the same on the line 10—10 of Fig. —9—. Fig. —11— is a view similar to Fig. —9— showing a modified form of construction of stem engaging disk. Fig. —12— is a central section of the same on the line 12—12 of Fig. —11—. Fig. —13— is a fragmentary detail plan view of the means employed for initially gripping the stems for the accomplishment of the primary stripping operation. Fig. —14— is a view partly in elevation and partly in section on the line 14—14 of Fig. —13—. Fig. —15— is a detail vertical transverse section on the lines 15—15 of Figs. —13— and —14—. Fig. —16— is a fragmentary detail plan view of the forward end of the gripping mechanism, the gripping jaws being removed. Fig. —17— is a fragmentary detail plan view of the gripping mechanism shown in Fig. —13—, the jaws being therein shown open preparatory to receiving a stem therebetween. Fig. —18— is a view similar to Fig. —17— showing the parts in another position. Fig. —19— is a fragmentary detail view showing the means employed for adjustably mounting a gear wheel on one of the shafts employed. Fig. —20— is a fragmentary detail longitudinal section on the line 20—20 of Fig. —19—. Fig. —21— is a fragmentary vertical transverse section on the line 21—21 of Fig. —1—. Fig. —22— is a detail perspective view showing a cam employed for positively opening the gripper jaws shown in Figs. —13—, —17— and —18—. Fig. —23— is a detail view in section on an enlarged scale showing a knife removably mounted adjacent the strippers for severing the stems when desired. Fig. —24— is a fragmentary detail section on the line 24—24 of Fig. —23—.

In stemming tobacco by hand it is customary to grasp the stem of the leaf between the thumb and the index finger of one hand and loosely engage said stem at its juncture with the leaf between the thumb and index finger of the other hand, and by then maintaining the last-named hand rigid and drawing the stem with the other hand to separate the leaf from the stem throughout the entire length of said stem. The operation generally is not performed by a single pull on the stem relatively to the leaf but by a plurality of short pulls alternated with intervals of slight reverse movement so as to prevent the leaf from bunching to such an extent against the fingers of the rigid hand as to interfere with what may be termed the shearing action requisite to accomplish the severance along and in the closest possible proximity to the stem or middle rib of a leaf, constituting the extension of said stem.

I have ascertained by very careful observation and experiment that the bunching of the leaf against what may be termed the shearing members prevents the latter from exercising their functions because a considerable quantity of leaf is interposed between the shearing edge and that portion of the stem or rib along which the shearing operation must be continued. The bunched leaf thus interposed acts more or less as a cushion and owing to its yielding nature may be said to form a tapered or flaring mouth through which the stem must be drawn. This flaring or tapered mouth, instead of promoting severance of the leaf from the stem tends rather to fold the leaf inwardly against the stem in the nature of a collapsible fan thus merely thickening the stem and becoming wedged in the opening formed between the bunches of leaf. When such bunching has taken place after stripping part of the leaf from the stem, as last above described, a further pull on the stem is resisted to such a degree as to cause the latter to break. Thus only part of the stem and middle rib are removed from the leaf and to then complete the stemming requires more time and care than was originally the case. Furthermore, such tearing and breaking of the stem usually causes the outer end portion of the leaf, which is always the last to be severed from said stem or middle rib, to tear usually at some distance laterally from the stem or middle rib thus greatly deteriorating the value of said leaf for purposes of cigar manufacture in particular. The accumulation of so-called scrap, that is, very small pieces of leaf, is very detrimental for the reason that the same can be used only in the manufacture of very cheap cigars or other cheap grades of bulk tobacco for pipe consumption and, therefore, in stemming it is requisite that the operation be effected as efficiently as possible so as to leave as little leaf as possible on the stem, such small pieces being relatively difficult to remove and when removed constituting the so-called scrap above referred to.

In my present machine I endeavor to follow as closely as possible the stemming operation as most efficiently performed by hand, the object of the machine being, of course, to take the place of hand labor at the usual smaller cost and to enable a very large quantity of leaf to be uniformly and efficiently stemmed in a very short space of time.

A further object of the invention is to provide means whereby the leaf may be partially stemmed to a predetermined extent and that portion of the stem and middle rib thus severed from the leaf may be cut off, this being the preferable mode of operation in stemming tobacco for the manufacture of cigarettes and pipe tobacco.

The machine is further intended and designed to remove scrap from the stems after the primary stripping operation has been completed, and, further, to remove from the machine at respectively different points, all leaves which may have escaped the stripping mechanism, the stripped leaves, the stems and the scraps.

The details of construction of the machine have been designed with a view to accomplishing the particular objects above set forth in an efficient manner.

Referring primarily to Fig. —5— it will be seen that upon the frame of the machine, which is constructed and designed to meet my needs, there are mounted two sets of shafts which will be hereinafter specifically identified by reference character, there being three shafts in each set. On each of said shafts of each set there is mounted a pulley 1, 2 and 3 respectively, over which a belt 4 is trained. Each of said belts 4 is adapted to be fed with leaves either mechanically or manually upon the portion thereof horizontally disposed between the pulleys 1 and 2. The leaves are adapted to be laid thereon so that the stems thereof project from the side edge nearest adjacent the stripper disks 5, which will be hereinafter more fully described, so that the stems of said leaves may be engaged by said stripper disks as said leaves are carried over the pulleys 2 and between the vertical portions of the belts 4 lying between the pulleys 2 and 3, the leaves being thus primarily carried horizontally and then vertically for and during engagement with a second set of stripper disks 6 which will be hereinafter also more fully described. The said pulleys 1, 2 and 3 derive their movement through the train of the gearing which I will now proceed to describe.

Referring to Figs. —1— or —2— there is shown a drive shaft 7 driven from any suitable source of power by means of the pulley 8 thereon, there being a loose pulley 9 on said shaft for usual and obvious reasons. Said shaft 7 is journaled in bearings in the side plates of the frame and at the end opposite that carrying the pulleys 8 and 9 is equipped with a spur pinion 10 which meshes with a spur gear 11 on a shaft 12 extending parallel with said shaft 7 and which is also journaled in bearings in the side plates of the machine. The said shaft 12 is provided with a spur pinion 13 which meshes with an idle gear 14, shown in dotted lines in Fig. —2—, which is suitably mounted on a stud disposed upon one of the side plates of the machine. Meshing with said spur gear 14 is a spur gear 15 on a shaft 16 journaled in bearings in the side plates of the machine. The said shaft 16 is provided at its other end with a spur pinion 15ª which meshes with a spur gear 17 on a shaft 18 also journaled in bearings in the side plates of the machine. The said spur gear 17 meshes with a spur gear 19 on a shaft 20, also journaled in bearings in the side plates of the machine. The latter carries a miter gear 21 between its ends which meshes with the miter gear 22 on the vertical shaft 23 journaled in bearings suitably supported on the frame of the machine. The said shaft 23 carries two bevel gears 24 and 25 respectively, meshing with the bevel gears 26 and 27, respectively, on the shafts 28 and 29 respectively. Each of the latter carries a spur gear 30 and 31 respectively, the former of which meshes with the spur gear 32 on a shaft 33 and the latter of which meshes with a spur gear 34 on the shaft 35. The said shafts 28 and 33 carry th said pulleys 2 respectively, while the shafts 29 and 35 carry the pulleys 3 respectively. The pulleys 1 are mounted upon the shafts 36 and 37 respectively, the former of which is geared to the shafts 28 and 29 by means of the sprocket chain 38 trained over sprockets mounted upon said respective shafts, as clearly shown in Fig. —5—. The shaft 37 is similarly geared to the shafts 33 and 35 by means of the sprocket chain 39. The said sprocket chains 38 and 39 serve to positively gear the shafts 36 and 37 to the positively driven shafts 28, 29, 33 and 35 thus relieving the said belts 4 from the performance of these functions, the latter being thus purely feed-belts. On said shafts 28 and 33 respectively are mounted what I term the stripper disks 5, each of the latter, as shown in Figs. —9— and —10—, consisting of a hub 40 equipped at one end with an annular flange 41 between which and a collar 42 threaded on said hub 40 circular disks 43 and 44 are disposed, the latter being parallel with each other. Projecting between said disks 43 and 44 and secured therein by means of rivets 45 are, what may be termed, substantially quarter segments 46 of a circular plate constituting what I termed the disk 5. The said quarter segments 46 are separated from each other by spaces occupied by sliding members 47 adapted to reciprocate in the slots thus formed between opposing edges of adjacent segments 46. The said sliding members 47 are provided in their outer ends with V-shaped recesses 48, the walls of which are flush with the beveled corner portions 49 of the quarter segments 46 when said members 47 are disposed at the outer limits of their movement. The said quarter segments 46 and sliding members 47 together constitute a substantially circular disk provided at four points in its periphery with V-shaped notches, the walls of which are preferably disposed at right angles to each other and which are spaced equi-distantly from each other. Each of said members 47 is provided between its ends with a longitudinal slot 50 through which the rivet or pin 51 passes, the latter being mounted in said circular disks 43 and 44 and serving to permit said members 47 a limited reciprocal movement relatively to said disks 43 and 44 and said segments 46. The said members 47 are maintained yieldingly at the outer limits of their movement by means of the springs 52 interposed between the inner ends of the same and the peripheral wall of the hub 40. The said strippers 5 disposed upon the shafts 28 and 33 are arranged so that during rotation thereof the V-shaped recesses in the peripheries thereof will oppose each other to form primarily a recess in which the stem of a leaf is received and which subsequently closes to form an opening which is gradually contracted as said opposing recesses approach the horizontal plane intersecting the axes of said shafts 28 and 33 becoming smallest when the deepest portions of said recesses lie in said plane. The opening thus formed is at this point in the rotation of said disks barely large enough for the passage of the stem of the leaf so as to loosely engage the latter and permit it to be drawn in a direction parallel with the axes of said shafts 28 and 33 to strip the leaf from said stem. If the stem engaged in said opening should be extraordinarily heavy or there should be two or more stems simultaneously engaged therein the members 47 will yield so as to exert a very light pressure on said stems thereby enabling the same to be readily drawn in the aforesaid direction for the purpose of simultaneously stripping all of the leaves therefrom. As shown in Figs. —11— and —12— the said stripper disks may be modified in construction and produce substantially the same result. The disks 53 there shown consist each of a single circular plate provided with the rectangular V-shaped notches in its periphery and which is provided with a central opening from which recesses 54 extend radially outwardly. The hub 55 provided with an annular flange 56 is adapted to project through said central opening, the latter being of larger diameter than said hub and also of larger diameter than the annular flange 57 of the member 58 threaded on said hub and which is further provided with an annular flange 59 opposing the flange 56 of said hub. The springs 60 project into said recesses 54 and bear at their opposite ends upon said annular flange 57 and the outer or bottom walls of said recesses 54. Rivets 61 pass through said opposed flanges 56 and 59 and through openings 62 in said disk 53 of larger diameter than the shanks of said rivets, the said disk being thus capable of movement in all directions radially of said hub 55 and being thus capable of yielding to separating pressure exerted by the reception in the opposed notches of two of said disks 53 of stems of unusual thickness or number. In order to prevent movement of said disk 53 in the direction longitudinally of its axis of rotation the said flanges 56 and 59 are equipped on their peripheries with collars 63 which project beyond the opposing faces of said flanges into contact with the opposite faces of the disk thus serving to radially guide the latter. The construction shown in Figs. —9— and —10— is preferable to that shown in Figs. —11— and —12—, the latter being, however, cheaper.

Having described the means for feeding leaves and the means for engaging the stems thereof between the strippers 5, I will proceed to describe the means whereby the stem of the leaves are engaged and drawn in a direction parallel with said shafts 28 and 33 so as to partially strip the leaves therefrom. The said means consists of, what I term, grippers. These are shown in detail in Figs. —13— to —18— inclusive. Longitudinally movable on the shafts 28 and 33 is a plunger 64 having a central hollow cylindrical portion 65 in which is a longitudinal slot 66. Beyond the forward end of and rigid with the latter are two parallel opposed cam members 67 having opposed parallel faces 68 and beveled forward end portions 69. At their inner ends said opposed parallel faces terminate in beveled faces 70 forming the forward end walls of recesses 71 in the opposed faces of said members 67. The foregoing details are best shown in Fig. —16—. The said plunger 64 is adapted to be reciprocated and to this end is connected by means of a projection 72 extending downwardly from the rear end portion of the same with a longitudinally movable plunger 73 carrying sleeves or bearings 74 which are supported and longitudinally movable on said shafts 35 and 29. At its other end said plunger 73 is equipped with a projection carrying an anti-friction roller 75 which engages in the groove of a cam 76 mounted on the shaft 12. The said plunger 73 is threaded at the end portion engaging said projection 72 and is equipped with a collar 77 and a nut 78 engaging opposite ends of the sleeve 79 at the lower end of said projection 72, said plunger being thus rendered adjustable relatively to said sleeve 79 to determine the limits of movement of said plunger 64 relatively to the travel of a plunger 80. The latter has a cylindrical end portion 81 which fits within the hollow cylindrical middle portion 65 of the plunger 64 and is connected by means of a pitman 82, pivotally connected with the bearing block 83 mounted upon said cylindrical portion 81 of said plunger and projecting through the slot 66 in the cylindrical portion 65 of the plunger 64, with a segment 84 mounted upon a rock shaft 85 suitably journaled in bearings in the side plate of the machine. The said pitman 82 is provided between its ends with a turn buckle 86 by means of which it may be adjusted in length. The end portion of said plunger 82 connected with said segment 84 engages in a substantially radially disposed slot 87 in the latter thus permitting the stroke of said pitman 82 and thereby that of the plunger 80 to be varied at will. The said segment 84 is connected with a pitman 88 engaging the crank 89 on the shaft 16 heretofore referred to. The forward end portion of said plunger 80 is flat and substantially rectangular in cross-section and to the same there are pivotally secured, at one end each, two jaws 90 by means of the bolt 91. Said jaws 90 are equipped between their ends with projections 92 between which anti-friction rollers 93 are rotatably mounted, the latter being adapted to ride upon the opposed parallel faces 68 of the members 67 of the plunger 64 and over the beveled faces 69 and 70 at the ends of said opposed parallel faces. The said jaws 90 are normally maintained separated by means of a helical compression spring 94 interposed between the same adjacent their pivotal connection with the plunger 80, said jaws being closed against the action of said spring by the engagement of the anti-friction rollers 93 with the said opposed parallel faces 68 of the members 67. The pins 95 on which the anti-friction rollers 93 are rotatably mounted project downwardly to points below the lower faces of the member 67 of said plunger 64 and in the path thereof two cam arms 96 are disposed, the latter extending parallel with the bevel faces 69 and serving by engagement with said pins 95 to insure positive opening of the jaws when the latter reach the forward limit of their movement. The position of said jaws 90 when opened preparatory to the reception therebetween of stems of leaves to be stemmed is clearly shown in Fig. —17— in full lines, and in dotted lines in said figure is shown the position of said jaws when closed, the said position being also shown in full lines in Figs. —13— and —18—. When said jaws 90 are open, as shown in Fig. —17—, the plunger 80 is disposed at the forward limit of its movement remaining substantially in this position only during the brief interval necessary for the crank 89 to pass the horizontal plane of the axis about which it rotates. During this interval the stripper disks will have brought the stem of a leaf into the path of the free end portions of said jaws 90 and during the time that said leaf passes into and partly through the path of said free end portions the plunger 64 is moved forward thereby obviously closing said jaws 90 and causing the latter to grip the stem of the leaf therebetween. Simultaneously with the forward movement of the plunger 64 the plunger 80 begins its rearward movement thereby drawing the stem through the opening between the stripper disks and stripping the leaf therefrom. The said plunger 64 remains at the forward limit of its movement while the plunger 80 completes its rearward movement thus bringing the anti-friction rollers 93 opposite the recesses 71 whereupon the said spring 94 will cause said jaws to open thus releasing the stem of the leaf. Immediately following the opening of the jaws 90 the plunger 64 is caused to move relatively quickly to the rearward limit of its movement thus again closing the jaws 90 while the plunger 80 returns to the forward limit of its movement as shown in Fig. —17— whereupon the foregoing operation is repeated. It will be obvious that the rotation of the stripper disks must accord with the movements of the plungers 64 and 80 so that the stem of the leaf will be engaged between said jaws 90 at the right moment and the stripping operation quickly effected during the time that the opening between the stripper disks, through which the stem projects, is approaching its least area and must be completed immediately after it has attained its least area. Such adjustment is effected by the means illustrated in Figs. —19—, —20—, and —21—. As shown in Fig. —20— the shaft 35, for example, is equipped with a collar 97 held rigid with said shaft by means of the pin 98. Said collar is equipped with an annular flange 99 provided with diametrically oppositely disposed elongated slots 100 through which set screws 101 pass, the latter entering threaded openings in the annular flange 102 of a sleeve 103, the latter being thus rigidly mounted on the shaft 35 but adjustable rotatably relatively thereto. The combined bevel gear 27 and spur gear 31, for example, shown in Fig. —2— as being mounted upon the shafts 28 and 29, is splined upon said sleeve 103 in a well-known manner. The said sleeve 103 is journaled in a bearing, as shown in said Fig. —20—. Thus the position of any one of the shafts 28, 29, 33 and 35 may be adjusted relatively to the gear wheel by means of which movement is imparted thereto and as said stripper disks are rigidly mounted on said shafts, the latter will obviously be adjusted relatively to the gearing actuating the same thus enabling the exact relative times of the meeting of the notches of opposed disks to be varied. As every component operating element of the machine is positively geared to the single drive shaft 7 it will be obvious that an adjustment of said sleeve 103 relatively to the collars 97 will serve to vary the time of presentation of stems to engagement by the gripping jaws 90 without affecting the times of actuation of the latter. The exact time of actuation of said gripping jaws 90 is determined exclusively by the cam 76 and the turn buckle 86 and slot 87 in the segment 84. By means of the turn buckle 86, slot 87 and segment 84 the exact moment of completion of the closing movement of the gripping jaws 90 is determined without, however, affecting the time of beginning of the closing movement thereof, the latter being incapable of variation by said adjusting means. The said gripping jaws 90 effect only a portion of the stripping operation by imparting a pull to the stem of the leaf for a distance equal substantially to one-half more or less the total length of the leaf. Upon completion of said movement the said gripping jaws 90 open and release the stem of the leaf which is thereupon carried between the opposed vertical portions of the belts 4 into engaging relation to the second pair of stripper disks 6 mounted upon the shafts 29 and 35 respectively, and which operate in exactly the same manner as said strippers 5. The speed of travel of the belts obviously coincides with the peripheral speed of said strippers 6 and the latter are timed to oppose the peripheral recesses or notches therein to receive the stem of the partly stripped leaf as it is brought down by the belts. As soon as said stem and leaf are released from engagement with the strippers 5 and grippers 90 the stripped portion of the leaf is free to expand or unroll itself so that at the time of engagement of the stem with the second set of strippers, the bunching of the previously stripped portion of the leaf will have disappeared.

Tobacco leaves vary in length to a great extent so that the total length of strokes necessary to stem the same must be equal if done by a single operation to the longest leaf possible to be encountered in the tobacco bale. The plunger 80 has a given stroke which may be varied to some extent by means of the slot 87 of the segment 84 but inasmuch as the same is intended to be of less length than the length of the leaves to be stemmed, said stroke may be said to be fixed. To complete the stemming operation, however, the stem must be drawn a distance varying with the length of the leaf being stemmed. It is, therefore, necessary to provide a secondary stem-engaging mechanism for completing the stemming operation by which there is imparted to the stem, motion sufficiently long to insure complete severance of the same from the leaf. It is well-known that the outer end or point portion of the leaf is more tender and thinner than the inner end portion thereof and that the stem or middle rib tapers to practically a needle point in the point of the leaf. Consequently, less pull is required to be imparted to the stem to complete the stemming operation than was required to start the same.

The secondary stemming means is clearly shown in Fig. —6—. It consists of a roller 105 mounted upon a vertical shaft 106 journaled in bearings in a bracket 107 which in turn is provided between its ends with a bearing 108 in which a short horizontal shaft is journaled. The latter is equipped at one end with a miter gear 109 meshing with a miter gear 110 on the shaft 106 and at its other end carries a miter gear 111 meshing with the miter gear 112 on a shaft 113 extending longitudinally of the machine and geared by means of the miter gears 114 and 115 to the shaft 116 journaled in bearings in the side plates. The said shaft 116 is in turn geared to the shaft 7 by means of the sprocket chain 117 trained over the spur pinion 118 on the shaft 116 and over the sprocket wheel 119 on said shaft 7.

A lever 120 pivotally mounted between its ends upon a cross-bar 121 of the frame of the machine is equipped at one end with a roller 122 between which and the roller 105, the stem of the leaf is adapted to be engaged. The roller 122 is an idle roller and is rotated by frictional surface contact with the roller 105 or with an interposed stem through which motion is transmitted thereto. At its other end said lever 120 is equipped with a projection carrying an anti-friction roller 123 which engages in the groove of the cam 124 by means of which said lever 120 is rocked at intervals corresponding to the intervals of feed of leaves to the second set of strippers so as to engage the latter in proper time to complete the stripping operation. It will be seen that by means of the sprocket 119 and the sprocket pinion 118 and the train of gearing for transmitting movement to said roller 105 that the latter rotates at a relatively high speed so that upon the engagement of a stem between said roller 105 and said roller 122 the stripping operation will be very rapidly completed, this being necessary for the reason that said stripping should be completed before the opening between the stripper disks through which the stem is pulled shall have attained a sufficiently great area to enable a part of the leaf to be drawn therethrough with the stem. Attention is further directed to the fact that the second strippers 6 are disposed farther rearward than the strippers 5 so as to prevent the engagement of any part of the leaf itself between said strippers 6 that is to say, the stem is engaged in the opposed recesses of the strippers 6 at a point nearer the stem end of the leaf than the last point of engagement of the same between the strippers 5.

It is desirable in stemming tobacco to be used in the manufacture of cigarettes and pipe tobacco to only partially remove the stem therefrom, that is to say, the leaf may be stripped from said stem throughout about one-half or two-thirds of the length of the leaf, the remaining tender portion of the middle rib being left in the leaf. By means of my machine this method of stemming may be readily accomplished as that of completely stemming the leaf, this being preferably effected by interposing in the path of the stem as it is carried downwardly between the strippers, a knife 104 coacting with one of said disks to shear the stem at a given point in the movement of said disks as shown in Figs. —23— and —24—.

Below the feed belts 4 are two delivery belts 125 and 126 trained over pulleys 127, 128, 129 and 130 respectively. The pulley 127 is rigidly mounted on a shaft 131 which is geared by means of sprockets over which the sprocket chain 132 is trained, to the shaft 29. The pulley 128 is loosely mounted on a shaft 133 geared by means of the sprocket chain 134 to the shaft 35. The said shafts 131 and 133 rotate in respectively opposite directions and on the latter there is rigidly mounted a pulley 130 over which the belt 126 is trained, the latter being also trained over a pulley 129 loosely mounted on the shaft 131. Between the belts 125, 126 and the belts 4, I provide a belt 137 trained over pulleys 138 and 139 mounted on shafts journaled in bearings on a bracket 140, shown in Fig. —1— and Fig. —2ᵃ—. The shaft carrying the pulley 138 is geared by means of the sprocket chain 141 to the shaft 142 which is in turn geared by means of a sprocket chain 143 to the shaft 143ᵃ. The said belt 137 travels in a direction at right angles to the direction of travel of the respective belts 4, 125 and 126 and is adapted to receive and deliver upon the belt 125 all of those leaves which are deposited upon the belts 4 and the stems of which escape the stripping devices 5 and the grippers 90. The said belt 126 is disposed in the path of the stripped leaves delivered from the stripper 105. It will be noted that the stemmed leaves are thus delivered by the belt 126 from one side of the machine while all unstemmed leaves are delivered by the belt 125 to the other side of the machine.

The stems removed from the leaves by the rollers 105 and 122 are projected by the same upon a carrier belt 144 trained over a pulley 144ᵃ on the shaft 142 and over a pulley 145 on a shaft 146 disposed at a lower elevation than said shaft 142 and geared to the latter by means of the sprocket chain 147. Adjacent the delivery end of said belt 144 there is disposed a pair of rollers 148 geared to rotate in opposite directions and having their surfaces covered with a yielding frictional material, such for example as rubber. One of said rollers is geared to the shaft 146 by means of a sprocket chain 149, the other of said rollers 148 being geared to the first-named by means of spur gears mounted on the shafts of said rollers as clearly shown in detail in Fig. —8—. The stems delivered from the belt are engaged between said rollers 148 which rotate at a relatively low speed and are delivered thereby into operative relation to a pair of rotating cylindrical brushes 150 mounted on shafts 151 and 152 geared together by means of the spur gears 153 and 153ª on said respective shafts, the latter being of less diameter than the former so as to impart higher speed thereto. On the shaft 151 there is also mounted a spur pinion 154 which meshes with a spur gear 155 on a shaft 156 geared by means of the sprocket chain 156ª to the shaft 7. The bristles of said rotating brushes 150 are preferably made of steel wire and are adapted to remove from the stems all leaf adhering thereto, said stems being fed relatively slowly by the rollers 148 to the action of said brushes 150 which rotate at a much higher surface speed than the speed of travel of said stems. The stems after passing between said brushes 150 are adapted to be projected by the latter into engaging relation to a pair of rollers 157 also preferably rubber covered and geared to rotate in unison in opposite directions, said rollers being preferably geared to the shaft 151 by means of an idle gear 158 suitably mounted upon a stud on the frame of the machine and meshing with the spur gear 153 and with the spur gear 159 on the shaft of the upper roller 157, the said rollers 157 being thus rotated at a greater surface speed than said brushes 150. The scrap removed by said brushes 150 from the stems may be delivered from the machine in any suitable manner, as for example, by introducing a jet of air into the space between the said brushes 150 and rollers 157 whereby said scrap would be blown laterally from the machine, or, by employing a suction fan, would be sucked therefrom and delivered into any suitable receptacle. The use of a blower or suction fan for similar purposes is old and well-known and constitutes no part of the invention and is, therefore, omitted from illustration.

While the operation of the machine will probably be fully understood from the foregoing, a brief description thereof is here repeated for purposes of convenience.

As previously stated the leaves to be stemmed are fed in any suitable manner upon the belts 4 so that the stems of said leaves project into the path of the stripper disks 5. The said leaves are preferably fed upon the belts at approximately regular intervals so as to cause the stems thereof to project relatively straight through the opening formed between the opposed notches of the respective disks and thus into engaging relation to the grippers 90. The said stems are received in a notch of one of said disks as said leaf approaches one of the pulleys 2 over which the belts 4 are trained and said stem lies in said notch while it is carried through an arc of approximately 90 degrees by the belt. During this movement two of the notches or recesses in the opposed stripper disks become opposed and form an opening through which the stem extends and during the travel of said stem and leaf through the final ten or fifteen degrees, above referred to, said stem will have been engaged by the grippers 90 and the withdrawing or stripping of the latter from the leaf will have begun, the said grippers completing the rearward stroke substantially simultaneously with the further travel of the leaf vertically a distance substantially equal to the length of the arc of ten or fifteen degrees last above referred to. At this time the stem will have been released by said grippers 90 and will be delivered from engagement between the disks 5 and carried by the opposed vertical portions of the belts 4 into engaging relation to the opposed stripper disks 6, the latter being disposed at a distance horizontally and longitudinally of the machine from the plane of the stripper disks 5. After the stems have been released from engagement with the stripper disks 5 the bunched portion of the leaf formed by stripping the same from the stem is given an opportunity to expand and depend, this being essential, as has been pointed out, to successfully perform the stemming operation. The point at which the stem is engaged between the stripper disks 6 is at a point somewhat removed from the point of juncture of the remaining portion of the leaf with the stem. The latter is engaged between the rollers 105 and 122 during the time that the opening formed between the opposed disks 6 approaches its smallest area so that as said stem is quickly drawn by said rollers through the opening the last remaining portion of the leaf is severed therefrom. The stripped leaf falls upon the belt 126 and is delivered from the machine. In the event that any leaves are so laid upon the belt as to prevent the engagement of the stems thereof between the disks 5 the said leaf will be delivered by the belts 4 upon the belt 137 which carries it rearwardly and delivers the same upon the belt 125 which delivers the same upon the side of the machine opposite leaf from the side of the machine opposite to that from which the stemmed leaves are delivered.

The operation of the grippers 90 and the rollers 105 and 122 has been heretofore recited in detail as has been also the operation of the stem delivery belt 144 and the stem cleaning mechanism by means of which all scrap is removed from the stems.

In the event that it is desired to only partially stem the leaf, that is, so that a portion of the middle rib thereof shall remain in the point portion of the leaf and the latter thus delivered in a bifurcated condition from the machine, the knife 104, shown in Figs. —23— and —24—, will be mounted upon the frame of the machine adjacent the stripper disks 6, above referred to. The said knife 104 is preferably provided with a very sharp edge disposed at an incline and so near to the rear face of the adjacent disk 6 as to coact with the latter in the manner of a shear so that as the stem is brought down to a given point at which the leaf will have been stripped therefrom to the desired extent, the said stem will be severed. The exact point in the movement of the disks at which such severance takes place must be ascertained by experiment and will be determined by the point in such movement at which the stem is engaged between the rollers 105 and 122 and the speed of longitudinal movement imparted to said stem by said rollers. By means of the segmental arm 84 and the slot 87 therein the stroke of the plunger 80 carrying the gripping jaws 90 may be adjusted at will so as to primarily sever the leaf from any desired given length of stem and middle rib as will be obvious.

The machine embodying the invention is relatively simple and may be rendered very durable and efficient. It will be understood, of course, that the drawings show only what I believe to constitute a suitable embodiment of the invention, it being my intention, however, to simplify the mechanism as far as can possibly be done and to make such changes in construction as mechanical skill may dictate to the end that the greatest efficiency may be obtained.

The essence of the invention resides in the means whereby the leaf is first partly stripped from the stem and the stripped portion then permitted to unfold itself before stripping proceeds further and is completed. The mechanism shown and described for accomplishing this is believed to constitute the most efficient embodiment of the invention but it will be apparent to skilled mechanics that other mechanism may be readily designed to perform the same or similar operations and accomplish the same result. The invention includes, broadly, any mechanism operating in substantially the same way to produce the desired result.

The recessed opposed disks presenting openings through which the stem is adapted to project serve to loosely embrace the stem and to engage the leaf. The stem is engaged in the said openings only to the extent that it is held against lateral movement in all directions relatively to the disks. The latter may also be aptly termed "leaf retarding means" or "stripping means." The relative locations of the respective pairs of stripper disks afford means for permitting the stripped portion of the leaf to unfold itself between the intervals of performance of the stripping operations. The embrace of the stem by the second strippers at a point forward of the last point of embrace thereof by the first stripper disks is equivalent to imparting reverse movement to the stem for a distance equal to the distance between the vertical planes of the respective strippers but affords a saving of time over that which could be effected by imparting reverse movement to the stem. The mechanism shown and described enables the two stripping operations to be simultaneously performed upon different leaves in the same time that a primary forward and back movement could be imparted to the stem if this method were carried out.

I claim as my invention:

1. In a tobacco stemming machine, means for imparting successive stripping movements to the stem relative to the lamina of the leaf, arranged so that the succeeding stripping movement begins at a point within the length of the preceding movement.

2. In a tobacco stemming machine, means engaging the stem and lamina of the leaf respectively for imparting relative movement thereto at successive intervals for severing the one from the other, so arranged that each successive relative severing movement between the stem and the lamina is begun from a point on the stem from which the lamina has been severed by a previous relative severing movement between said stem and said lamina.

3. In a tobacco stemming machine, stripping means for engaging the body of the leaf during the stripping operation, and means for gripping the stem for imparting longitudinal movement thereto relatively to the leaf engaging means at successive intervals whereby the leaf is stripped from the stem, so arranged that each successive relative severing movement between the stem and lamina is begun at a point between the limits of the next preceding similar movement.

4. In a tobacco stemming machine, a stripping mechanism including devices whereby a succession of relative movements are imparted to the stem and lamina of the leaf for severing the same, said devices including means whereby the successive relative severing movement between the stem and lamina is begun at a point between the limits of the preceding similar movement.

5. In a tobacco stemming machine, means for loosely embracing the stem of the leaf, means for engaging said stem for moving the same longitudinally relatively to said embracing means for partially stripping the leaf therefrom, a second stem embracing means, a carrier for delivering the leaf from said first to said second embracing means, and means for imparting further longitudinal movement to said stem relatively to said second embracing means whereby the leaf is completely stripped from the stem.

6. In a tobacco stemming machine, the combination with means arranged to receive the stem of a leaf, and means adapted to engage said stem to impart predetermined longitudinal movement thereto relatively to said receiving means to partially strip the leaf from said stem, of secondary stem receiving means adapted to embrace the latter at a point between its ends removed from the last point of embrace thereof by said first-named receiving means, and secondary means for engaging said stem for imparting indeterminate longitudinal movement thereto relatively to said secondary stem receiving means to complete the severance of the leaf from the stem.

7. In a tobacco stemming machine, a plurality of pairs of opposed members provided with recesses each adapted during relative movement of said members of each pair to form a pocket open at the top and upon further movement to form an opening between said members and thereafter to again form a pocket open at the bottom, said respective pairs of said members disposed in parallel vertical planes and each adapted to receive and embrace a tobacco stem successively at different points, and stem engaging means disposed adjacent each pair of said members and adapted to successively engage and impart longitudinal movement to the tobacco stem.

8. In a tobacco stemming machine, a plurality of pairs of opposed members provided with recesses each adapted during relative movement of said members of each pair to form a pocket open at the top and upon further movement to form an opening between said members and thereafter to again form a pocket open at the bottom, said respective pairs of said members disposed in parallel vertical planes and each arranged to receive and embrace a tobacco stem successively at different points, and stem engaging means disposed adjacent the first pair of said members for imparting predetermined longitudinal movement to the stem relatively to said members, and stem engaging means disposed adjacent the last pair of said members for imparting indeterminated longitudinal movement to the stem.

9. In a tobacco stemming machine, a plurality of pairs of opposed oppositely rotatable members provided in their peripheries with recesses, the recesses of each pair being adapted during relative rotation of the members thereof to form an opening between said members and thereafter to again form a pocket at the bottom, said respective pairs of said members disposed in parallel vertical planes and each adapted to receive and embrace a tobacco stem successively at different points, and stem engaging means disposed adjacent each pair of said members and adapted to successively engage and impart longitudinal movement to the tobacco stem.

10. In a tobacco stemming machine, a plurality of pairs of opposed oppositely rotatable members provided in their peripheries with recesses, the recesses of each pair being adapted during relative rotation of the members thereof to form a pocket open at the top and upon further movement to form an opening between said members and thereafter to again form a pocket open at the bottom, said respective pairs of said members disposed in parallel vertical planes and each arranged to receive and embrace a tobacco stem successively at different points, and stem engaging means disposed adjacent the first pair of said members for imparting predetermined longitudinal movement to the stem relatively to said members, and stem engaging means disposed adjacent the last pair of said members for imparting indeterminate longitudinal movement to the stem.

11. In a tobacco stemming machine, the combination with means for engaging the stem of a leaf for intermittently imparting longitudinal movement thereto during the stripping operation, of means adapted to loosely embrace said stem to permit free longitudinal movement thereof relatively thereto and adapted to retard the leaf whereby the latter is stripped from the stem.

12. In a tobacco stemming machine, the combination with opposed overlapping stripping elements provided in their opposed edges with recesses adapted at a point in the relative movement of said members to form openings therebetween through which the stem of a leaf is adapted to pass, of reciprocable stem engaging means adapted to impart predetermined longitudinal movement to an engaged stem relatively to said elements to partly strip the leaf from said stem, a second pair of said elements, a carrier for conveying the leaf and stem thereto after release thereof by said first-named opposed means and reciprocable means respectively, said second elements located to engage the stem at a point forward of the last point of engagement thereof by said first elements, and rotatable stem engaging means adapted to impart further longitudinal movement to the stem relatively to said last-named opposed means for completing the stripping operation.

13. In a tobacco stemming machine, the combination with a carrier for leaves to be stemmed, of movable means disposed adjacent said carrier and adapted at given points in their travel and in the travel of said carrier to loosely embrace the stems of the leaves carried by the latter, and devices disposed adjacent said means for engaging the free end portion of the stem of each leaf for intermittently imparting movement thereto transversely to the direction of travel of the belt and relatively to said means.

14. In tobacco stemming machine, the combination with stripping elements adapted to loosely embrace the stem and engage the leaf, of means adapted to engage the stem to impart predetermined movement thereto relatively to said stripping means to partly strip the leaf therefrom, and means adapted to engage the stem after release thereof by said first-named stem engaging means for imparting indeterminate movement to said stem relatively to the stripping means to complete the stripping operation, said stripping elements being arranged to permit the bunched portion of the leaf primarily stripped to unfold between the intervals of the respective stripping operations.

15. In a tobacco stemming machine, the combination with opposed relatively movable stripping members provided with opposed recesses adapted during relative movement of said members to present openings for the passage of stems of leaves received therebetween, of reciprocable stem engaging means adapted to impart predetermined movement to the stems in one direction to partly strip the leaf therefrom, rotatable stem engaging means adapted to impart further indeterminate movement to the stems in the same direction after release thereof by said reciprocable means, said stripping members adapted to embrace the stems before movement thereof by said rotatable means at a point forward of the point of embrace thereof at the completion of the movement thereof by said reciprocable means, whereby the stripped leaf is permitted to unfold between successive stripping operations.

16. In a tobacco stemming machine, the combination with means adapted to engage the stem of a leaf and impart primary predetermined longitudinal movement thereto, and means adapted to engage said stem after release thereof by said first-named means to impart further indeterminate movement thereto in the same direction, of stem embracing means coacting with said respective stem engaging means to strip the leaf from the stem, said respective stem embracing means disposed in parallel vertical planes disposed at a distance from each other, whereby the partly stripped leaf is enabled to unfold between the intervals of embrace thereof.

17. In a tobacco stemming machine, the combination with reciprocable means adapted to engage the stem of a leaf and impart primary predetermined longitudinal movement thereto, and rotatable means adapted to engage said stem after release thereof by said first-named means to impart further indeterminate movement thereto in the same direction, of stem embracing means coacting with said respective stem engaging means to strip the leaf from the stem, said respective stem embracing means disposed in parallel vertical planes disposed at a distance from each other, whereby the partly stripped leaf is enabled to unfold between the intervals of embrace thereof.

18. In a tobacco stemming machine, a traveling carrier for leaves, stem embracing means disposed adjacent said carrier and adapted to present openings in which the stem is received and through which it is adapted to be drawn to strip the leaf therefrom, a reciprocable member, normally open gripping jaws carried thereby, a member reciprocable relatively to said first-named reciprocable member adapted to close said jaws to engage a stem and means carried by said last-named reciprocable member for maintaining said jaws closed during movement of said first-named member in one direction.

19. In a tobacco stemming machine, a traveling carrier for leaves, stem embracing means disposed adjacent said carrier and adapted to present openings in which the stem is received and through which it is adapted to be drawn to strip the leaf therefrom, a reciprocable member, normally open gripping jaws carried thereby, a member reciprocable relatively to said first-named reciprocable member adapted to close said jaws to engage a stem and means carried by said last-named reciprocable member for maintaining said jaws closed during movement of said first-named member in one direction, secondary stem embracing means adapted to receive the stems after release thereof by the first-named means and said gripping jaws, a driven roll and an idle roll between which the stem is adapted to be engaged to impart further movement thereto in the same direction, and means for imparting relative movement to said rolls at intervals to engage and release the stems.

20. In a tobacco stemming machine, rotatable leaf stripping devices having peripheral recesses adapted to close around the stem of a leaf to be drawn through the opening formed thereby, shafts for imparting rotary movement thereto, and means effecting engagement between said shafts and said devices whereby the latter are permitted limited lateral and rotary movement relative to said shafts.

21. In a tobacco stemming machine, rotatable leaf stripping devices having peripheral recesses adapted to close around the stem of a leaf to be drawn through the opening formed thereby, shafts for imparting rotary movement thereto, means effecting engagement between said shafts and said devices whereby the latter are permitted limited lateral and rotary movement relative to said shafts, and springs interposed between said devices and their respective shafts for normally maintaining the same concentric with each other.

22. In a tobacco stemming machine, stripper elements rotatable relatively to each other in respectively opposite directions and having peripheral recesses adapted to close around the stem of a leaf and form an opening through which the same is adapted to be drawn, shafts carrying said elements for rotating the same, and means effecting engagement between said shafts and said elements arranged to permit limited lateral and rotary movement of said elements relatively to each other and to said shafts.

23. In a tobacco stemming machine, stripper elements rotatable relatively to each other in respectively opposite directions and having peripheral recesses adapted to close around the stem of a leaf and form an opening through which the same is adapted to be drawn, shafts carrying said elements for rotating the same, means effecting engagement between said shafts and said elements arranged to permit limited lateral and rotary movement of said elements relatively to each other and to said shafts, and springs interposed between each of said stripper elements and its actuating shaft for maintaining the same normally concentric with each other.

24. In a machine of the kind specified, a pair of oppositely rotatable disks overlapping each other and each provided in its periphery with V-shaped recesses, the latter when opposed in a medial line intersecting the axes of rotation of said disks presenting openings through which the stems of leaves to be stemmed are adapted to project and be drawn to strip the leaf therefrom, members movable relatively to said disks forming the innermost portions of the walls of said recesses, and springs normally maintaining said members at the outer limits of their movement.

25. In a machine of the kind specified, a pair of oppositely rotatable disks overlapping each other and each provided in its periphery with V-shaped recesses, the latter when opposed in a medial line intersecting the axes of rotation of said disks presenting openings through which the stems of leaves to be stemmed are adapted to project and be drawn to strip the leaf therefrom, and means for effecting yielding engagement of stems in the said openings presented between said disks.

In testimony whereof I have signed my name in presence of two subscribing witnesses.

GEORGE F. ECKART.

Witnesses:
RUDOLPH WM. LOTZ,
M. M. BOYLE.

Copies of this patent may be obtained for five cents each, by addressing the "Commissioner of Patents, Washington, D. C."